United States Patent [19]

Ziller

[11] Patent Number: 4,844,794
[45] Date of Patent: Jul. 4, 1989

[54] PLATE-TYPE FILTER

[75] Inventor: Josef Ziller, Waldstetten, Fed. Rep. of Germany

[73] Assignee: Schenk-Filterbau Gesellschaft mit beschränkter Haftung, Waldstetten, Fed. Rep. of Germany

[21] Appl. No.: 90,315

[22] Filed: Aug. 27, 1987

[30] Foreign Application Priority Data

Aug. 29, 1986 [DE] Fed. Rep. of Germany ....... 3629374

[51] Int. Cl.$^4$ ............................................. B01D 25/36
[52] U.S. Cl. ..................... 210/97; 210/107; 210/239; 210/330; 210/332; 210/347
[58] Field of Search ................ 210/97, 107, 324, 330, 210/331, 332, 345, 346, 347, 239, 391

[56] References Cited

U.S. PATENT DOCUMENTS

| 3,608,731 | 9/1971 | Seggebruch | 210/331 |
| 4,104,169 | 8/1978 | Muller et al. | 210/331 |
| 4,322,295 | 3/1982 | Brokhage | 210/331 |

Primary Examiner—W. Gary Jones
Attorney, Agent, or Firm—Becker & Becker, Inc.

[57] ABSTRACT

A plate-type filter that is provided with a sealing element that is disposed in the flow path of liquid that is to be filtered and seals off the in-flow region relative to the filling space of the filter housing. The sealing element is movable into its sealing position under the pressure of in-flowing liquid. The sealing element is therefore in the sealing position only when liquid is flowing in. When the filter elements are rotated for centrifuging off the filter cake, the sealing element is no longer in its sealing position due to the absence of liquid pressure, so that the sealing element is not stressed during the centrifuging process.

10 Claims, 2 Drawing Sheets

PLATE-TYPE FILTER

BACKGROUND OF THE INVENTION

The present invention relates to a plate-type filter for filtering liquids, especially wine, beer, or chemical liquids, with plate-like filter elements being disposed one above another in a container or housing that is provided with a filling space. The filter elements are seated on a central, rotatable hollow shaft, with at least one inlet having an in-flow region being provided for supplying liquid that is to be filtered to the hollow shaft and hence to the filter elements.

With heretofore known plate-type filters of this general type, the liquid that is to be filtered is introduced into the housing via the inlet. During the filtering process, a filter cake forms on the filter elements. When this cake reaches a certain height, it is centrifuged off by rotating the hollow shaft. During this centrifuging process, the supply of liquid to the housing is discontinued.

It is an object of the present invention to embody a plate-type filter of the above referenced general type in such a way that even after repeated centrifuging of filter cakes, a satisfactory sealing off of the in-flow region relative to the filling space in the housing is assured, so that a high filtration quality is achieved.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
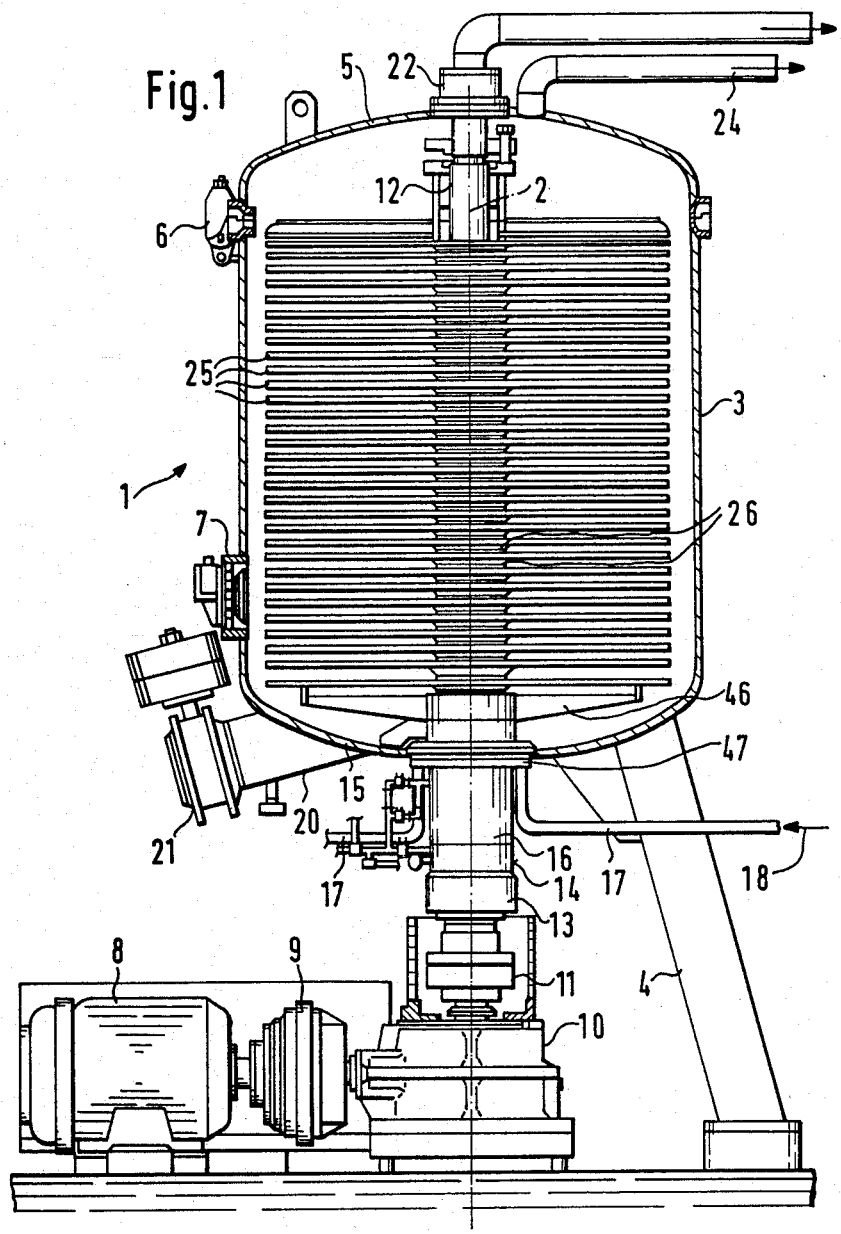
FIG. 1 is a partiallly sectioned side view of one exemplary embodiment of the inventive plate-type filter.
Figure 2:
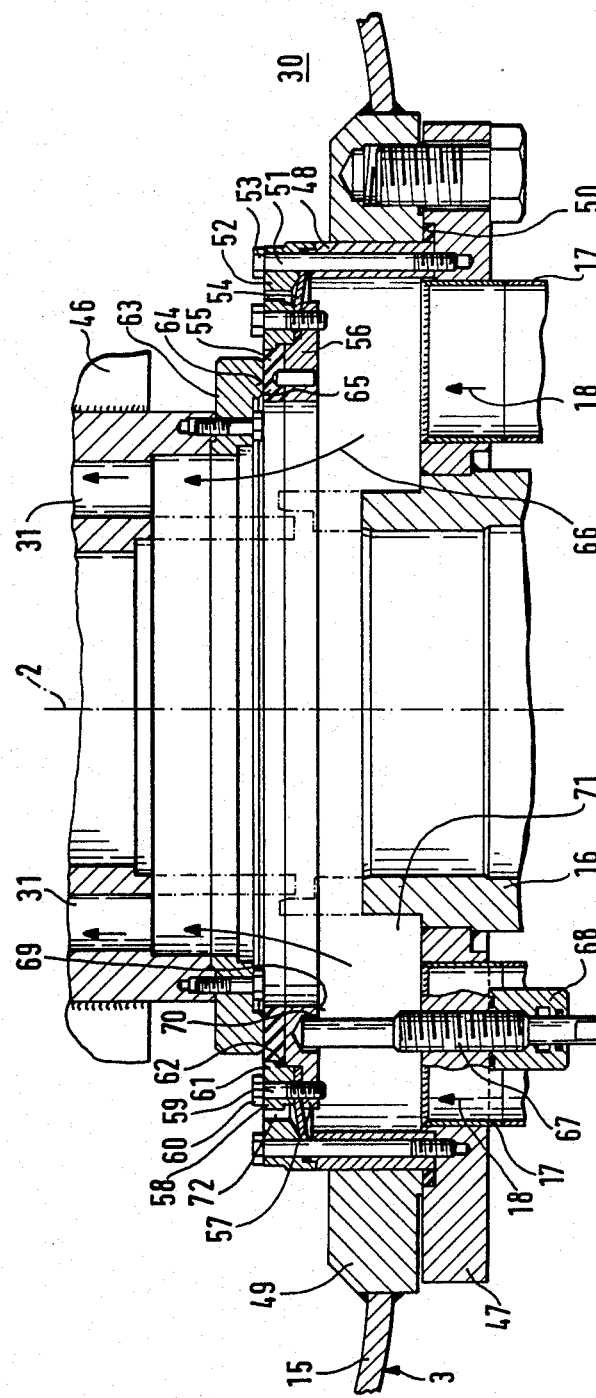
FIG. 2 is an enlarged cross-sectional view of the inlet region of the plate-type filter of FIG. 1.

The filter of the present invention is characterized primarily in that at least one sealing element is disposed in the flow path of liquid that is to be filtered from the inlet to the filter elements for sealing off the in-flow region relative to the filling space, with each sealing element being movable into a sealing position under the pressure of in-flowing liquid.

In the inventive plate-type filter, the sealing element, which seals off the in-flow region relative to the filling space, is moved into the sealing position under the pressure of in-flowing liquid. As soon as liquid is no longer being supplied, the sealing element accordingly moves out of its sealing position. Thus, when the hollow shaft with the filter elements is rotated for centrifuging off the filter cake, the sealing element, pursuant to the inventive configuration, no longer assumes its sealing position because no liquid is being supplied during the centrifuging process. As a result, the sealing element is not stressed during the centrifuging process, and therefore is not being subjected to wear during this period. If a filtering process is again initiated subsequent to the centrifuging process, the sealing element is again immediately moved into its sealing position under the pressure of the in-flowing liquid. Since the sealing element is not subjected to wear during the centrifuging process, it still provides a very satisfactory sealing effect even after a large number of centrifuging processes, so that a uniformly high filtration quality is assured.

Further specific features of the present invention will be described in detail subsequently.

DESCRIPTION OF THE PREFERRED EMBODIMENTS

Referring now to the drawings in detail, the plate-type filter 1 is provided for filtering liquids, such as wine, beer, chemical liquids, etc., and includes a housing 3 with a vertical axis 2 and a bottom 15. The housing 3 rests on the legs 4 of a stand, and has a detachable cover 5 that is sealingly secured to the housing via clamp screws 6 to close the housing. In addition, the housing 3 is provided with an inspection glass 7. Accommodated in the housing 3 is a hollow shaft 12 on which the hubs 26 of the filter elements 25 are disposed one above the other in a known manner. The unit of filter elements 25 formed in this manner rests on a support member 46 that is fixedly connected to the hollow shaft 12 and, for example, has the shape of a cross support or spider. In the illustrated embodiment, the filtered liquid is preferably conveyed downwardly in the holow shaft 12 to an outlet. An electric motor 8 serves for driving the hollow shaft 12. Via a fluid coupling 9, a transmission gearing 10 embodied as a miter-wheel gearing, and a shaft coupling 11, the electric motor 8 is drivingly connected to the hollow shaft 12, which extends coaxially through the housing 3. Disposed above the coupling 11 is a bearing 13 for the hollow shaft 12, as well as a sealing chamber 14 that is connected to an inlet connector 16, which is centrally disposed in the bottom 15 of the housing 3. For withdrawal of the filtered filtrate residue and the filtering aids, the bottom 15 of the housing 3 is provided with a tubular piece 20 that is directed downwardly at an angle and is provided with a shutoff valve 21.

The plate-type filter 1 has at least one supply inlet 17. In the illustrated embodiment, two supply inlets 17 are provided approximately diametrically opposite one another, and are embodied as tubes. The liquid 18 that is to be filtered is introduced into the housing 3 from below in the direction of the arrows via the supply inlets 17. The latter are provided on a flange 47 of the inlet connection 16, which is embodied as a distribution chamber, and is secured to the housing 3 via the flange 47.

An annular wall 48 is secured, preferably detachably, to the flange 47. The annular wall 48 rests against the thicker edge portion 49 of the bottom 15, and extends axially there beyond. The flange 47 rests against the underside of the edge region 49 accompanied by the interposition of at least one annular seal 50. Axially extending threaded bolts 51 pass through the annular wall 48 about its periphery and allow the annular wall to be pulled tightly against the flange 47 of the distribution chamber 16. Disposed on the annular wall 48 is a ring 52 through which the threaded bolts 51 also pass, with the heads 53 of the bolts resting on the ring 52. The latter is preferably comprised of ring segments that make it possible to completely empty (for biological reasons), an annular chamber 72. The radially outer end of a resilient bracket 54 for a sealing element 55 is clamped between the ring 52 and the end face of the annular wall 48. The resilient bracket 54 is preferably an annular diaphragm, with the threaded bolts 51 passing through the radially outer edge of the diaphragm.

The sealing element 55, which is embodied as a sealing ring, is seated on an annular support element 56 to which the sealing element is preferably detachably connected. The support element 56 has a radially outwardly extending projection 57 of reduced thickness onto which is securely clamped, via a clamping ring 58, the radially inner end of the resilient bracket 54. Threaded bolts 59 are provided for this clamping, with these bolts being distributed over the periphery of the clamping ring 58 and being screwed into the radial projection 57 of the support element 56. The heads 60 of the bolts 59 rest on the clamping ring 58. That side of the clamping ring 58 that faces the heads 60 of the threaded bolts 59 is provided with a radially inwardly projecting, circumferential projection 61, via which the clamping ring 58 overlaps a radially outwardly directed, circumferential projection 62 of the sealing element 55. In this way the sealing element 55 is also axially secured by the clamping ring 58. The threaded bolts 59 pass through the resilient bracket 54 in the vicinity of the radially inner rim thereof.

A cooperating sealing ring 63 is associated with the sealing element 55; the sealing ring 63 is secured, preferably detachably, to the underside of the support member 46. On one end face, the cooperating sealing ring 63 is provided with a radially extending cooperating sealing surface 64 against which, in the sealing position, a similarly radially extending sealing surface 65 on an end face of the sealing element 55 rests.

The resilient bracket 54, which is in the form of a diaphragm, is embodied in such a way that the sealing element 55 is spaced from the cooperating sealing ring 63, so that a radial annular gap remains between the cooperating sealing surface 64 and the sealing surface 65. The width of this annular gap is preferably in the order of magnitude of, for example, approximately 0.5 mm. The width of the annular is preferably adjustable, so that a pressure differential (necessary for a satisfactory supply of the liquid that is to be filtered) between the filling space 30 and the in-flow chamber 66 can be optimally adjusted as a function of the type of medium that is to be filtered, the in-flow pressure, etc. For this purpose, stops 67 are distributed over the periphery of the support element 56. The stops 67 are axially adjustably disposed in the flange 47. The support element 56 with the sealing element 55 rests against the stops 67 in a non-sealing position. The stops 67 are preferably threaded bolts that are screwed into the flange 47, with a nut 68, that rests against the underside of the flange 47 and is screwed onto a respective bolt, serving to secure that bolt in its adjusted position. Recesses 70 into which the stops 67 extend are preferably provided in the underside 69 of the support element 56.

The support element 56 with the sealing element 55 is supported on one side via the resilient bracket 54. The support element 56 with the sealing element 55 and the clamping ring 58 sags under its weight. In so doing, the support element 56 rests on the stops 67. When the liquid that is to be filtered is introduced into the housing 3 in the direction of the arrows via the supply inlets 17, the support element 56 with the sealing element 55 is pressed upwardly in the direction of flow under the pressure of the in-flowing liquid until the sealing surface 65 comes to rest sealingly against the cooperating sealing surface 64. Thus, a sealing effect is achieved only when the liquid is flowing, with the seal being greater as the pressure exerted by the in-flowing liquid increases. The liquid that flows in via the inlet 17 first passes into an annular chamber 71 that is delimited radially outwardly by the annular wall 48 and radially inwardly by a portion of the inlet connection 16. Via this annular chamber 71, the liquid then flows upwardly into axially extending feed lines 31 that are provided in the hubs 26 of the filter elements 25. The feed lines 31 of the hubs 26 are lined with one another and are distributed over the periphery of the hubs. In addition, the hubs 26 of the filter elements 25 are provided with non-illustrated in-flow channels that open into the axial feed lines 31 and connect the latter with outwardly directed distribution chambers that are connected to the hubs. The liquid that is to be filtered flows from the feed lines 31, through the in-flow channels, into the distribution chambers, which are respectively provided below the filter elements 25. From the distribution chambers, the liquid that is to be filtered then flows to the lowermost filter element 25, on which the filter cake is built up in a known manner. The filtered, purified liquid then flows through non-illustrated, radially extending bores in the hubs of the filter elements 25 into the hollow shaft 12, and from there is either withdrawn upwardly or downwardly. In the embodiment of the plate-type filter illustrated in FIG. 1, the filtered liquid is withdrawn from the housing 3 via an outlet 22 provided on the cover 5. In addition, the outlet 22 accommodates bearing means for the hollow shaft 12. An air-vent pipe 24 is also connected to the cover 5.

When the liquid begins to flow into the annular chamber 71, the annular gap between the cooperating sealing ring 63 and the annular sealing element 55 is still open for a short period of time, so that in the beginning a certain amount of liquid leaks into the filling space 30. However, this slight leakage is insignificant with respect to the quality of the filtering process. Already shortly after the liquid has started to flow in, the sealing element 55 rests against the cooperating sealing ring 63 in the manner described and closes off the annular gap. As long as liquid is being supplied, the seal is maintained.

When the filter residues on the filter elements 25 have reached a certain height, they must be removed from the filter elements. For this purpose, the hollow shaft 12 with the filter elements 25 and the support member 46 that is fixedly secured to the shaft, are rotated about the axis 2. During this centrifuging process, no liquid is fed through the supply inlets 17. Since then no more pressure acts upon the sealing element 55, or the support element 56 thereof, the sealing element is lifted from the cooperating sealing ring 63, as a result of which the support element 56 comes to rest against the stops 67. Now when the hollow shaft 12 with the support member 46 is rotated, the sealing element 55 is spaced from the cooperating sealing ring 63. As a result, there is no friction on the sealing element 55. If the sealing element 55 would rest against the cooperating sealing ring 63 during the centrifuging process, the friction would be relatively great due to the relatively high circumferential speed and the bearing pressure. However, due to the described inventive configuration, the sealing element 55 is protected from wear, because during the centrifuging process it is lifted from the cooperating sealing ring 63. The sealing element 55 rests against the cooperating sealing ring 63 only when the support member 46 is not moving and liquid is being supplied through the supply inlets 17.

In place of the support element 56, it would also be possible to provide only the sealing element 55, which would then have an appropriate configuration. However, the use of the support element 56 has the advantage that the material for the sealing element can be selected while having to consider only an optimum sealing effect, whereas the support element 46 is embodied in such a way that the clamping ring 58 can be clamped securely against the support element.

In the illustrated embodiment, the liquid that is to be filtered is introduced into the housing 3 from below. However, it would be just as conceivable to introduce the liquid that is to be filtered into the housing from above in the manner described.

The present invention is, of course, in no way restricted to the specific disclosure of the specification and drawings, but also encompasses any modifications within the scope of the appended claims.

What I claim is:

1. In a plate-type filter for filtering liquids, with plate-like filter elements disposed one above another in a housing that is provided with a filling space, said filter elements being seated on a central, rotatable hollow shaft through which filtering liquid is carried away, with inlet means having an in-flow region being provided for supplying liquid that is to be filtered to said hollow shaft and hence to said filter elements, the improvement comprising:

means for sealing said in-flow region relative to said filling space including at least one sealing element movable into sealing position under pressure of in-flowing liquid to be filtered and disposed in a path of flow of liquid to be filtered from said inlet means to said filter elements, said means for sealing moving out of sealing position when liquid to be filtered is not supplied and forming a means for eliminating stress and wear of said sealing element during rotation of said hollow shaft and filter elements.

2. A plate-type filter according to claim 1, in which said sealing element is disposed in a suspended manner in an inlet region where said in-flow region of said inlet means leads into said hollow shaft.

3. A plate-type filter according to claim 2, which includes resilient connection means, connected to said housing, for effecting said suspension of said sealing element.

4. A plate-type filter according to claim 3, in which said sealing element has two sides, one of which is suspended, the other of which hangs freely in said inlet region, where it can be acted upon by in-flowing liquid.

5. A plate-type filter according to claim 4, in which said resilient connection means is an annular diaphragm.

6. A plate-type filter according to claim 5, in which said diaphragm has a radially inner side and a radially outer side, both of which are clamped in, but are movable relative to one another.

7. A plate-type filter according to claim 4, in which associated with said sealing element is cooperating sealing means that is fixedly connected to said hollow shaft, with said sealing element resting against said cooperating sealing means in said sealing position of said sealing element.

8. A plate-type filter according to claim 7, which includes stop means, with said sealing element, when no liquid is flowing-in, resting against said stop means in such a way as to be spaced from said cooperating sealing means.

9. A plate-type filter according to claim 8, in which said stop means is adjustable for adjusting the space between said sealing element and said cooperating sealing means.

10. A plate-type filter according to claim 9, in which said stop means comprises at least one threaded bolt.

* * * * *